May 19, 1953     R. IREDELL, JR     2,639,115
ANTIVIBRATION MOUNTING
Filed July 9, 1945     2 Sheets-Sheet 1

INVENTOR.
Robert Iredell Jr.
BY
Evans + McCoy
ATTORNEYS

Patented May 19, 1953

2,639,115

UNITED STATES PATENT OFFICE 2,639,115

ANTIVIBRATION MOUNTING

Robert Iredell, Jr., Wabash, Ind., assignor to The General Tire & Rubber Company, Akron, Ohio, a corporation of Ohio Application July 9, 1945, Serial No. 603,875

8 Claims. (Cl. 248—358)

This invention relates to vibration-insulating mountings and particularly to a vibration-insulating mounting which is adapted to provide a relatively sudden change in the spring or suspension characteristics when a given strain is exceeded.

For the isolation or insulation of vibrations from a vibrating body, a mounting with no frictional damping and with the greatest practical deflection per unit of load is most ideal. However, in any mounting system wherein the periods of the impressed vibrations are not constant, the mounted system is likely to go through a period of resonance, i. e. the point where impressed vibrations are equal to or near the natural frequency of the mounted system. Even though the impressed vibrations pass relatively rapidly through the resonance period, such large amplitudes are likely to occur in systems having a low damping factor that destruction of valuable apparatus takes place.

It has been proposed to provide frictional damping means in combination with the vibration-insulating mounting to absorb sufficient vibrating energy to effectively limit the amplitude of the vibrations at the period of resonance to a relatively low value. However, such frictional damping is not always desirable for the reason that the vibration transmission is a function of the amount of friction between the mounting and the mounted members, so that an increase in frictional absorption results in a substantial increase in vibration transmission at all frequencies. In order to overcome in large measure the undesirable effect of frictional damping at low amplitudes, it has been proposed (as set forth by Leon F. Thiry in application Serial No. 509,584, filed November 9, 1943) to loosely connect the damping means with suspension means, so that it only comes into play when the amplitude of vibration of the mounted member relative to the mounting member is larger than normal. However, while such a mounting results in substantial improvement, there still remains the tendency for considerable transmitted shock when the frictional means comes into play.

It is an object of the present invention to provide a resilient vibration-insulating support which limits amplitudes at or near the resonance period.

It is another object of the present invention to provide a soft resilient support, suitable for mounting instruments and the like, which limits the amplitudes at or near periods of resonance of the normal suspension without relying entirely on frictional absorption of the vibrating energy.

It is still another object of the present invention to provide a panel-mounting having relatively low frictional and damping characteristics at normal vibrating periods and having means for limiting the amplitude of vibration without simultaneously transmitting a large fraction of vibrating energy from the mounted to the mounting members.

Other objects will be apparent from the following description of the invention which is illustrated by the accompanying drawings, in which.

Figure 1:
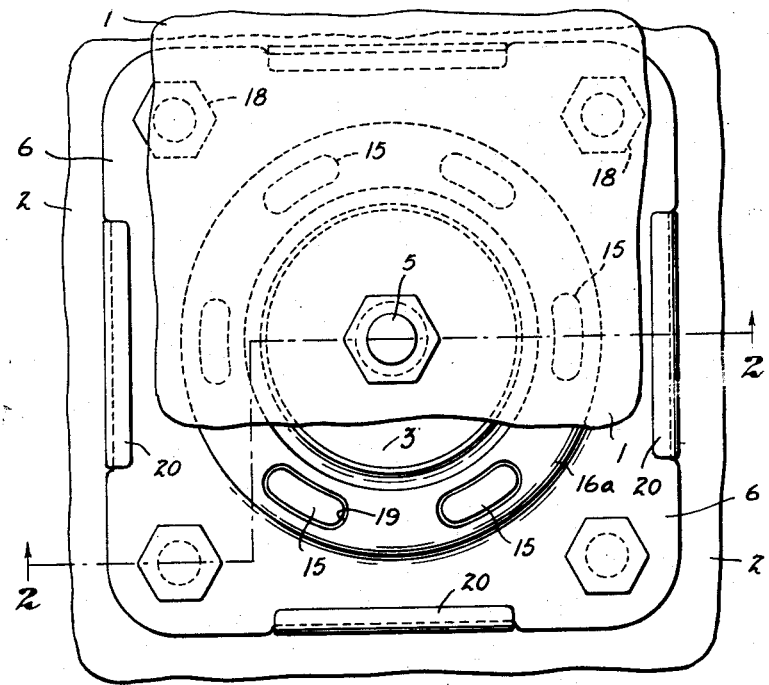
Figure 1 is a plan view, with parts broken away, of a portion of a system comprising two members subjected to relative vibrational movement connected by a mounting embodying the present invention.

The mountings of the present invention comprise a plurality of resilient elements or units, at least one of which operates as a main unit to isolate vibrations at normal frequencies and at low amplitudes and another of which operates as an auxiliary unit and is adapted to be deflected only when the main unit is subject to vibrations of greater than normal amplitudes, to cause a relatively marked change in the spring constant or stress-strain characteristics of the system. Prevention of vibrations of large amplitude in the region of resonance of the mounting system suspended by the main unit or units alone is thus had largely by change in point of resonance (a sudden shift in the natural frequency of the system) caused by the acting of the second normally unused mounting unit rather than solely by absorption of energy as in the case of frictional dampers alone. Preferably the hysteresis or the internal frictional characteristics of the auxiliary or second mounting unit, however, are somewhat higher than those of the main vibrating unit to provide a safety factor in case the spread between the natural frequencies of the system comprising the main units alone and the natural frequency of the system comprising the main and auxiliary units is not sufficiently great to give enough phase shift to prevent undesirable amplitudes. The main objects of the present invention are ordinarily accomplished in a highly successful manner by the use of two units having relatively low hysteresis or energy absorption within the resilient material.

Referring particularly to the drawings, in which like parts are indicated by like numerals of reference throughout the several views, my improved mountings comprise a plurality of flexible members, preferably annular in shape, of rubberlike material. The flexible members or annuli may have less axial thickness than diameter and generally have central and/or peripheral portions separated axially from each other. Connectors are provided for connecting a portion of the flexible members or annuli in parallel so that both annuli are subjected to shear strain when the shear strain to which one is subjected is sufficiently large. Generally the connections are arranged so that the inner connector connects the central region of said annuli together and to one of two members to be subjected to relative vibrational movement, and the other connector, which may comprise a housing for the peripheral portions of said annuli, connects the peripheral portions together and to the other of the members to be subjected to relative vibrational movement.

The mountings of the present invention are further characterized in that while one of the flexible annuli (the normally functioning or main annulus) is relatively firmly engaged by both the inner and outer connectors, the other (the auxiliary) annulus is firmly engaged by but one of the inner and outer connectors, and is loosely connected to the other to provide a space for lost motion. In this manner the resilient members or annuli are subjected to deflection or shear strain only after the other of said resilient members is subjected to a relatively large shear strain or axial deflection, as when the impressed vibration is relatively near a natural frequency of the system, comprising the mounted members carried by the mounting member through the main annulus.

Figure 2:
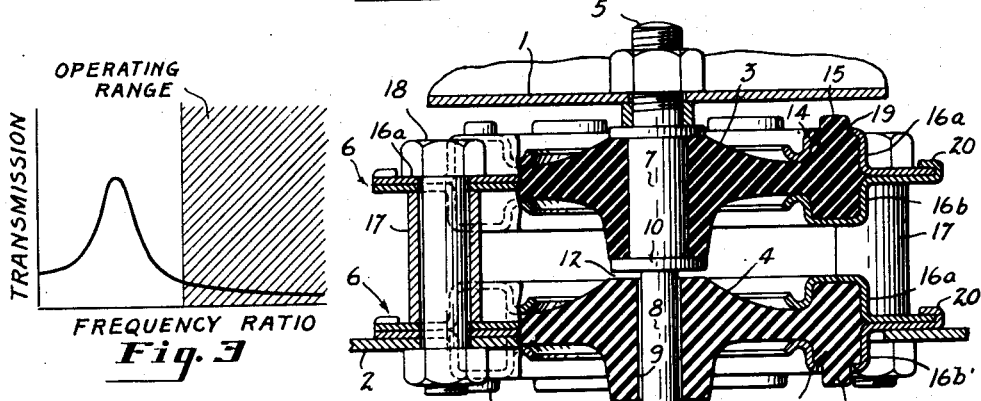
Fig. 2 is a sectional view on the line 2—2 of Fig. 1.

The mounting illustrated in Figs. 1 and 2 comprises a plurality of resilient annuli 3 and 4 coupled together through inner and outer fastening elements 5 and 6, respectively. Each of these fastening elements may be attached to one of the members to be subjected to relative vibrational movement. As shown the inner fastening element 5 is attached to the mounted member 1 and comprises a portion 7 which solidly engages the central portion of the annular resilient member 3 in the region of its bore, and a portion 8 loosely extending through a central opening 9 of the annular resilient member 4. The portion 8 rigidly carries thrust members 10 and 11 respectively which are spaced desirable distances 12 and 13, respectively, from the side portions of the auxiliary resilient annulus 4 to provide in cooperation with the portion 8 a lost motion connection so that the desired amount of deflection of the main resilient annulus 3 is had before deflection of the resilient member 4 occurs.

The annuli 3 and 4 preferably have less axial dimension than diameter and they extend substantially radially from the inner or central fastening element 5. They may each be provided with a thickened outer peripheral portion 14, which preferably has a plurality of upstanding projections or pins 15 also of resilient material extending axially from at least one face thereof.

The outer fastening element 6 shown attached to a mounting or base member 2 comprises a housing portion for each of the rims 14 of the flexible annuli, together with means, such as the spacers 17 and the bolts 18 for rigidly connecting the housing portions together and to the mounting member 2. The housing portions may be conveniently made up of cooperating portions 16a and 16b which may be fastened together by suitable means, such as the overturned portion 20 of one of the housing portions. The cooperating portions 16a and 16b may be provided with slots 19 which permit the projections 15 to extend therethrough beyond an axial face of at least one of the housing portions so that they may act as resilient bumpers if the mounting is deflected beyond a predetermined extent.

In the preferred mountings of the present invention, the main annulus 3, which engages both the inner and outer fastening elements, is preferably of a rubberlike composition having relatively low hysteresis or internal energy loss due to deflection. It may, for example, be molded from a natural rubber compound or from a synthetic rubber compound characterized by low heat build-up. The cooperating auxiliary annulus 4, which engages but one of the fastening elements and which is loosely connected by the lost motion device to the other, is ordinarily a resilient compound of substantially higher hysteresis loss or it should have sufficient stiffness to provide a marked spread between the natural frequencies (frequency of resonance) of the system considered as being mounted (1) only on the main annulus, and (2) as being mounted on both the main and auxiliary annuli in parallel, for example, a compound of synthetic rubber such as Buna S or other copolymer of one or more conjugated dienes and at least one unsaturated material having a single olefin group.

Figure 3:
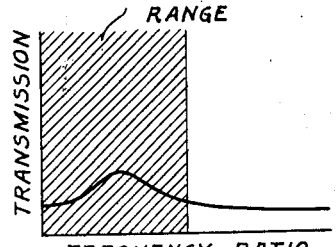
Fig. 3 illustrates a preferred characteristic curve of a main component of the mounting, showing the relative transmission through the mounting and between the mounted and mounting members as a function of the ratio of impressed frequency to that of natural frequency of the system.
Figure 4:
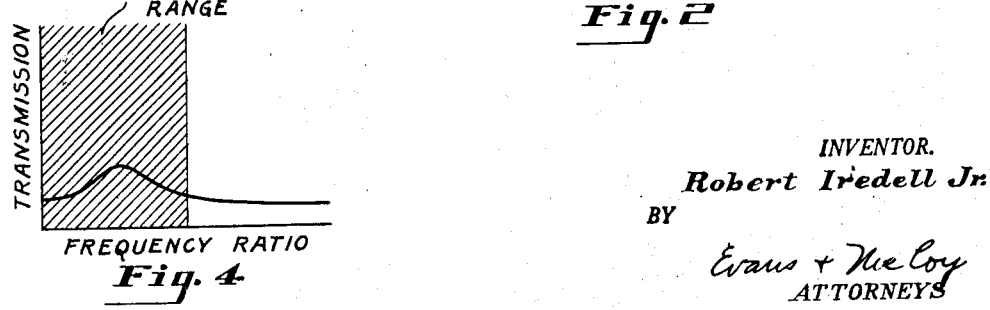
Fig. 4 is a similar characteristic curve for the auxiliary mounting component.

Since the annulus 3 has a relatively high internal efficiency, the transmission of vibrations therethrough is relatively low within frequency ratios occurring in the operating range, as illustrated in Fig. 3. When, however, the impressed frequency is sufficiently lowered, transmission through the mounting becomes very great, as indicated by the marked rise in the curve. The peak of this rise corresponds to the period of resonance of the system comprising the mounted member, the mounting member and the mountings. The transmission of vibrations through an annulus having relatively higher hysteresis or internal friction, is relatively greater at all frequencies, as illustrated by Fig. 4. By providing the lost motion connection, however, between the inner fastening element 5 and the bore or central portion of the annulus 4, with sufficient spaces 12 and 13 to permit the normal vibrations at frequencies within the normal operating range as indicated by Fig. 3, no vibrational transmission occurs within the normal operating range. When the frequencies of the vibrations impressed on the mounted member 1 are sufficiently low to come near the frequencies that would cause resonance of the normal system (only considering the annulus 3 as functioning) then the amplitude of vibration becomes progressively greater until the amplitude is greater than the spaces 12 and 13 and the deflection of the auxiliary resilient annulus 4 occurs. There then immediately results an increase in the effective stiffness of the mounting, with the result that the natural frequency may be shifted to a much higher value, which may be well outside of the critical transmitting range. By reason of such shifting, the transmission through the mounting is substantially less than the peak values indicated by the curves of Figs. 3 and 4.

From the above it is apparent that the least transmission of vibration through the mounting from the mounted to the mounting member will ordinarily occur when the hysteresis in both of the resilient annuli is least. However, it is usually found that an annulus 4 having a higher hysteresis provides a safety factor to effectively limit vibration should the shift in the spring constants of the mounting not be sufficient to change the natural frequency of the system to a sufficiently high value to reduce transmission of vibrations to the desired minimum. Due to the fact that all resilient material has some inherent hysteresis or energy absorption, it is seen that in mountings of the present invention the action of vibration-absorption may be both by a phase shift action due to a change in natural frequency of the system as well as some frictional damping, whereas heretofore, as far as I am aware, the reduction in transmission of energy and reduction in amplitude at or near the natural frequency of the normal system has been by the use of friction damping.

Figure 5:
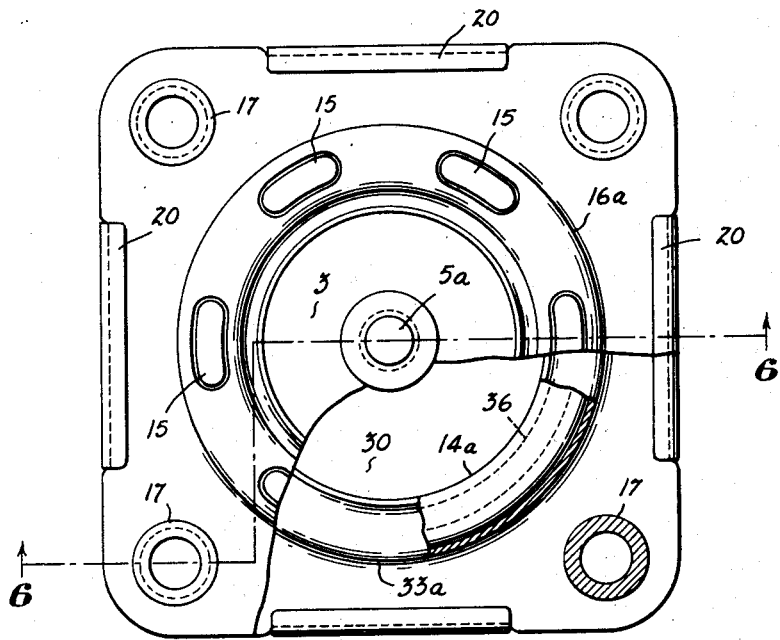
Fig. 5 is a plan view, with parts broken away, of a modified form of mounting embodying the present invention.
Figure 6:
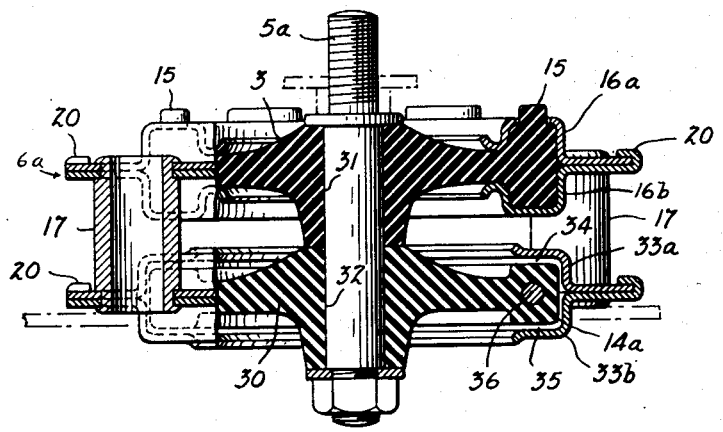
Fig. 6 is a sectional view on the line 6—6 of Fig. 5.

In the modification shown in Figs. 5 and 6, the annular resilient member 3 corresponds to that shown in Figs. 1 and 2. The annular resilient member 30 differs from the resilient annulus 4 of Fig. 3 in that the thickened rim 14a has been simplified by the absence of upstanding projections. The thickened rim 14a may be used with or without an annular stiffening member, such as a metal ring 36, disposed within the rubber-like material of the peripheral portion or rim 14a. The use of the metal ring 36 serves to increase the radial tension produced by deflection of the disc 30, to thereby reduce the deflection of the disc 30 under the higher imposed loads. Both of the annular resilient members 3 and 30 engage in the region of their central bores 31 and 32, respectively, portions of the inner fastening element 5a, which is adapted to be connected to one of the relatively vibrating members. The central portions of both of the annuli 30 and 3 are, therefore, subject to displacement substantially identical with the displacement of the central fastening element 5a. The outer peripheral portion of the annulus 3 is firmly engaged by the housing portions 16a and 16b of the outer fastening element 6a, which corresponds to the outer fastening element 6 of the modification shown in Figs. 1 and 2.

The outer fastening element 6a comprises the housing for the peripheral portion of the annulus 3, a tubular spacer 17, which also serves as means for fastening the portions of the outer fastening element together, and housing portions 33a and 33b for the peripheral rim of the resilient annulus 30. The housing, consisting of portions 33a and 33b, loosely confines the peripheral portion of the auxiliary resilient annulus 30. Spaces 34 and 35, which correspond in function to spaces 12 and 13 of Figs. 1 and 2, are provided opposite the rim 14a and the adjacent axial portions of the housing to permit relative axial movement of the rim 14a before it is engaged by the housing portions. Spaces 34 and 35 are preferably just sufficiently great to permit maximum permissible or normal vibrational movement of the mounted member relative to the mounting member without engagement between the peripheral portion 14a and the housing portions 33a or 33b. The height of the spacers 17 is preferably selected so that the spaces 12 and 13 or 34 and 35 are maintained when the mounting is in the loaded condition.

It is also apparent that many modifications of the invention may be made without changing the spirit thereof, and it is intended that the invention be limited only by the appended claims.

What I claim is:

1. A mounting comprising two flexible annuli of rubber-like material with free air circulation top and bottom and disposed in axial alignment, an inner connector for connecting central regions of said annuli together and to one of two members to be subjected to relative vibrational movement, said inner connector engaging both of said annuli, an outer connector engaging a peripheral portion of one of said annuli and loosely connecting a peripheral portion of the second of said annuli to provide an axial space for lost motion between said outer connector and said second annulus, all parts of the second annulus, which are adapted to bear against rigid portions of said outer connector upon application of just sufficient relative stress between said inner and outer connectors to take up said axial space between said outer member and one face of the second annulus, being radially spaced from all portions of said second annulus adapted to contact rigid portions of said inner connector, whereby one annulus is subjected to greater than static deflection only after the other annulus is subjected to vibrational deflection.

2. A flexible unenclosed mounting comprising a plurality of flexible annuli having less axial thickness than diameter and disposed with generally parallel axes, an inside connector connecting the central regions of said annuli together and adapted to be connected to one of two members that are to be subjected to relative vibration, an outer connector means for connecting peripheral portions of said annuli together and adapted to be connected to the other of said two members that are to be subjected to relative vibrational movement, one of said connectors engaging both of said annuli and the other of said connectors engaging one of said annuli and loosely connecting to the other of said annuli so as to provide a space for lost motion, a thickened outer circumferential rim on at least one of said annuli projections which extend axially from one axial face of said rim, said outer connector comprising a housing for said circumferential rim, at least one face of said housing having slots formed therein through which said projections extend to form buffers which come into operation as the mounting is deflected beyond a predetermined extent.

3. A system comprising a mounted member, a mounting member, a mounting having two resilient flexible unenclosed members of solid rubber-like material connecting said mounting and said mounted members and supporting said mounted members primarily by shear strain in one of said resilient members, means for connecting one portion of each of said resilient members firmly to one member of the group consisting of said mounting and said mounted members, means for connecting other portions only of each of said resilient members, which portions are radially spaced from the aforesaid portions thereof to the other of said mounted and mounting members, said latter means firmly connecting one of said resilient members and loosely connecting the other of said resilient members to provide for lost motion between said other resilient member, whereby one of said members is subjected to deflection only after the other of said resilient members is subjected to relatively large deflection, both of said resilient members being initially stressed in shear.

4. A vibration-insulating mounting comprising two flexible unenclosed annuli of resilient material with free air circulation top and bottom and disposed with their diameters in substantially parallel planes, an outer connector adapted to be connected to one of two relatively vibrating members and engaging peripheral portions of said annuli, an inner connector adapted to be connected to the other of said vibrating members and engaged by the bore of one of said annuli and having a portion extending loosely through the bore of a second of said annuli, thrust members carried by said inner connector, one of said thrust members being spaced from one side of the second annulus and another of said thrust members being spaced from and disposed facing an opposite side of said second annulus, portions of said thrust members adapted to contact said second of said annuli at the moment when it is initially deflected by axial load applied through said connectors, being radially spaced from all portions of said outer connector that are in simultaneous contact with the second of said annuli, whereby shear distortion of one of said annuli in substantial amount occurs before the second of said annuli is distorted in shear, and the second annulus acts to change the characteristics of the mounting when the normal mounting system is subjected to forces in the neighborhood of its critical frequency, said auxiliary annulus resisting axial deformation only through shear strain in said annulus and being free to move axially except for forces due to strain in said annuli.

5. A mounting comprising main and auxiliary flexible annuli of rubberlike material having less axial thickness than diameter having intermediate portions thinner than inner and outer portions having stress-strain curves of the same order and resisting deflection by both compression and tension and separated from each other, an inner connector for connecting central regions of said annuli together and to one of two members to be subjected to relative vibrational movement, an outer connector for connecting the peripheral portions of said annuli together and to the other of said two members, one of said connectors engaging both of said annuli and the other of said connectors engaging said main annulus and loosely connecting to the auxiliary annulus to provide axial space for lost motion between said connector and said auxiliary annulus, whereby said auxiliary annulus deflects only after the axial space for lost motion is taken up by a predetermined amount of axial deflection and the auxiliary annulus sustains a portion of the load of the system and shifts the natural frequency thereof, said annuli and said mounting resisting deflection only by strain in said annuli, said auxiliary annulus being unenclosed with free air circulation top and bottom.

6. A mounting comprising main and auxiliary flexible annuli or rubberlike material having less axial thickness than diameter and disposed with their axes in substantial alignment, an inner rigid connector for connecting central regions of said annuli together and to one of two members to be subjected to relative vibrational movement, an outer rigid connector for connecting the peripheral portions of said annuli together and to the other of said two members, one of said connectors engaging both of said annuli and the other of said connectors engaging the main annulus and loosely connecting to the auxiliary annulus to provide an axial space for lost motion between said connector and said auxiliary annulus, portions of said annuli contacted by one of said connectors being radially spaced from all portions of the annuli contacted by the other of said connectors, both of said annuli being free to move axially except for strain in said annuli, said main annulus supporting all the vibrational load until relatively large axial deflections are reached at which point said auxiliary annulus is engaged by the lost motion connection and supports an appreciable portion of the vibrational load and change the natural frequency of the system, said auxiliary annulus being unenclosed with free air circulation top and bottom.

7. The mounting of claim 6 in which the auxiliary annulus is at least as stiff as the main annulus.

8. The mounting of claim 5 wherein said annuli have similar cross-sectional shape.

ROBERT IREDELL, Jr.

References Cited in the file of this patent

UNITED STATES PATENTS

| Number | Name | Date |
|---|---|---|
| 2,382,372 | Wallenstein | Aug. 4, 1945 |
| 2,387,066 | Harding | Oct. 16, 1945 |
| 2,397,804 | Nakken | Apr. 2, 1946 |